United States Patent [19]

Mochizuki

[11] Patent Number: 4,768,488
[45] Date of Patent: Sep. 6, 1988

[54] FUEL INJECTION SYSTEM FOR AN INTERNAL COMBUSTION ENGINE

[75] Inventor: Kenji Mochizuki, Mitaka, Japan

[73] Assignee: Fuji Jukogyo Kabushiki Kaisha, Tokyo, Japan

[21] Appl. No.: 64,834

[22] Filed: Jun. 19, 1987

Related U.S. Application Data

[63] Continuation-in-part of Ser. No. 463,367, Feb. 4, 1983, abandoned.

[30] Foreign Application Priority Data

Feb. 10, 1982 [JP] Japan ................................. 57-20757

[51] Int. Cl.[4] .............................................. F02B 3/00
[52] U.S. Cl. ..................................... 123/478; 123/474
[58] Field of Search ......................... 123/474, 475, 478

[56] References Cited

U.S. PATENT DOCUMENTS

| | | | |
|---|---|---|---|
| 4,180,023 | 12/1979 | Kobayashi et al. | 123/475 |
| 4,213,425 | 7/1980 | Read | 123/478 |
| 4,388,907 | 6/1983 | Sugo et al. | 123/478 |

Primary Examiner—Raymond A. Nelli
Attorney, Agent, or Firm—Martin A. Farber

[57] ABSTRACT

A fuel injection system for an internal combustion engine having common intake manifold sections and branches communicating adjacent cylinders with each other via fuel-air intake valves of the cylinders. Fuel injection valves are disposed in the intake manifold sections in order to inject fuel. A fuel injection signal is provided for simultaneously opening all of the fuel injection valves for simultaneously injecting fuel therefrom while most of the intake valves of the cylinders are closed and not during the period of changing from the opening condition to closing condition of the remaining intake valves of the remaining cylinders.

17 Claims, 11 Drawing Sheets

FUEL INJECTION SYSTEM FOR AN INTERNAL COMBUSTION ENGINE

RELATED APPLICATION

The present application is a continuation-in-part application of my copending application Ser. No. 463,367 filed Feb. 4, 1983, now abandoned.

FIELD AND BACKGROUND OF THE INVENTION

The present invention relates to a fuel injection system for an internal combustion engine.

Various kinds of fuel injection system are known. For example, Japanese patent laid-open specification No. 55-37525 discloses a fuel injection system which operates to inject fuel in synchronism with the opening time of the fuel-air intake valve in dependency on pulse signals provided by sensing the angular position of a crank arm. Japanese patent laid-open specification No. 55-19933 discloses a system for injecting fuel at the opening times of the fuel-air intake valves of alternate cylinders in the opening order of the valves.

Figure 4:
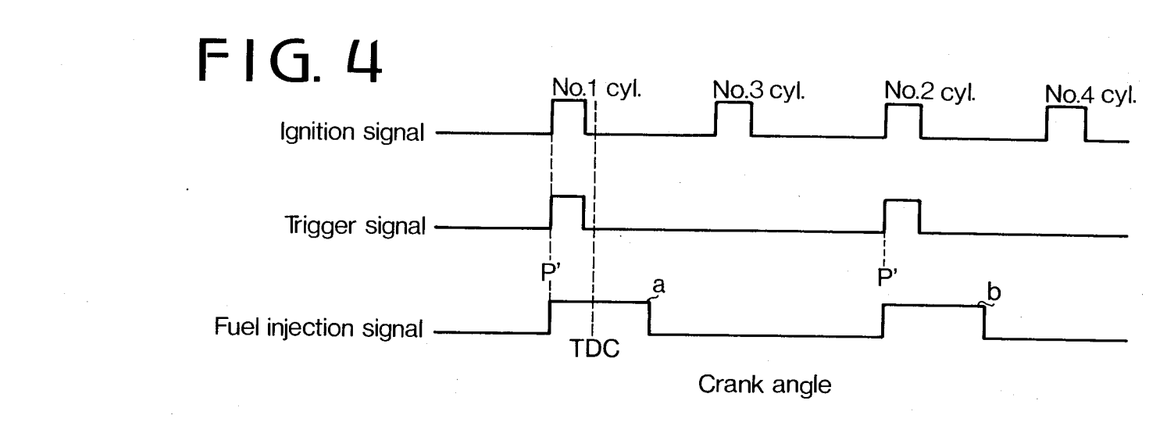
FIG. 4 is a time chart showing various signals in a conventional multi-injection system.

FIG. 4 is a time chart showing the fuel injection timing of a conventional multi-point injection system for an engine having four cylinders (FIG. 1A, 1B and 1C) in which cylinders Nos. 1 and 3 communicate with each other by one common intake manifold section 31 on one side of the engine and cylinders Nos. 2 and 4 communicate with each of the cylinders by another common intake manifold section 30 on another side of the engine. Further both common intake manifold sections 30, 31 communicate with each other via manifold branches 32, 33 connected thereto which in turn are connected to an intake passage 13. By the conventional system, fuel is injected simultaneously into all the common intake manifold sections 30, 31 from fuel injection valves I in each branch 30a, 30b, 31a, 31b (FIG. 1C) of the manifold sections 30, 31 adjacent each cylinder by trigger signals at every alternate ignition timing signal, as shown in FIG. 4 and described below.

In this system, the ignition (timing) signals occur in the intake valve opening order of the cylinders Nos. 1-3-2-4 respectively and are halved in order to produce trigger (pulse) signals for the injection times of all of the injection valves. For example, fuel is injected simultaneously from the respective injection valves I for each of the cylinders upon the occurrence of each of the respective fuel injection (pulse) signals a and b, the latter signals being produced from the trigger signals.

This system with simultaneous injection by all the injection valves saves software and hardware expenses of alternate injection for the fuel injection valves associated with the respective cylinders of the Japanese patent laid-open specification No. 55-19933. Yet defects exist with this system since fuel is unequally distributed into the cylinders with this system.

SUMMARY OF THE INVENTION

The object of the present invention is to provide an improved fuel injection system having simultaneous fuel injection and thus the advantages of reduced expenses yet which operates to inject fuel at a time so as to uniformly distribute the fuel to all cylinders of the engine.

The present inventor analyzed, and discovered the problem of the prior art as follows: FIGS. 8A to 8I show schematically the fuel/air mixture induction to each cylinder of the conventional system.

Figure 6:
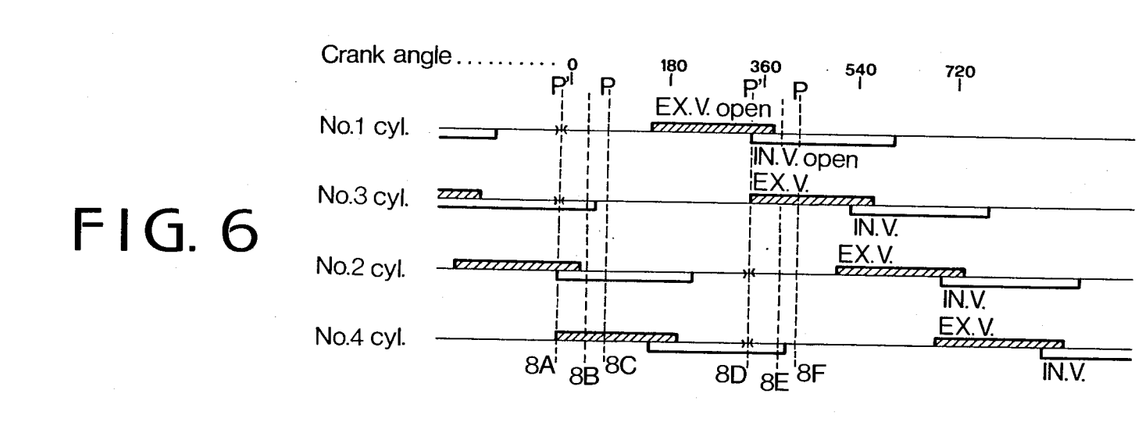
FIGS. 6, 6A, 6B and 6C are time charts showing the relationship between fuel injection timing and exhaust and intake valve timings.

Considering the fuel injection for the cylinders, the fuel injection by the fuel injection pulse signal a (FIG. 4) starts at point P' in FIG. 6 immediately before the end of the intake stroke of one of the cylinders, for example the No. 3 cylinder, (its intake valve "IN.V." shown being open - unshaded rectangle) close to or at the beginning of its closing time, i.e. it starts at the fuel injection timing at the point P' in the left half of FIG. 6 (shown as the left-most dashed line P'). This point P' in FIG. 6 also represents the leading edge of the fuel injection signal a of FIG. 4. Since the fuel is injected during the entire fuel injection signal a, the fuel is injected during the closing of the intake valve of the No. 3 cylinder. Generally a part of the injected air-fuel mixture induced into this No. 3 cylinder during its intake stroke flows back, upon closing of its intake valve, toward the adjacent intake valve of the No. 1 cylinder storing there extra fuel, causing unequal fuel distribution as will be explained in further detail below with reference to FIGS. 8A to 8F wherein the intake valves are illustrated schematically as T-shaped members for the cylinder Nos. 2 and 4 and as upside down T-shaped members for the cylinder Nos. 1 and 3.

Figure 8:
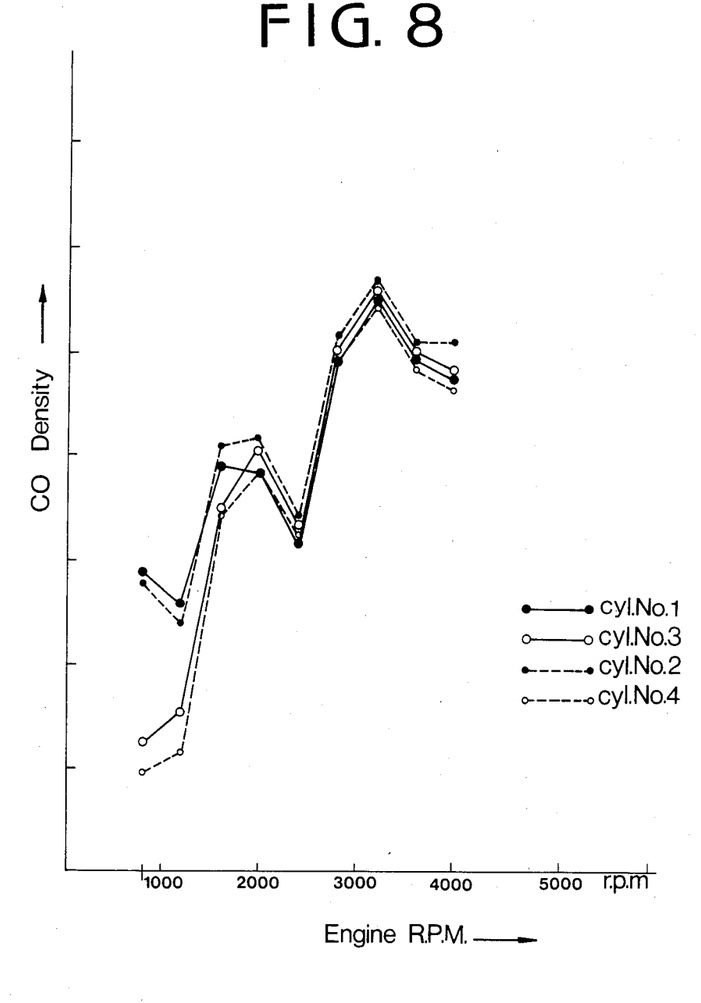
FIG. 8 is a graph showing CO density (mixture distribution) with the prior art fuel injection from beginning to end at various engine rpm when the throttle is fully opened (w.o.t.)
Figure 8A:
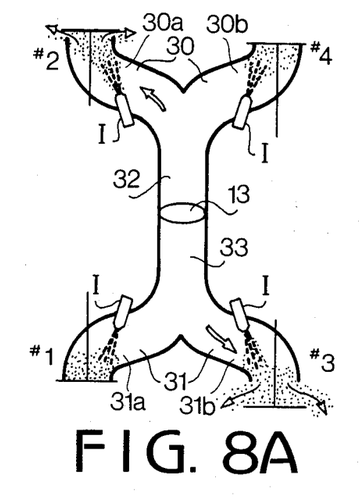
FIGS. 8A-8F are views of the manifold schematically showing fuel distribution at various stages of FIG. 6.
Figure 8B:
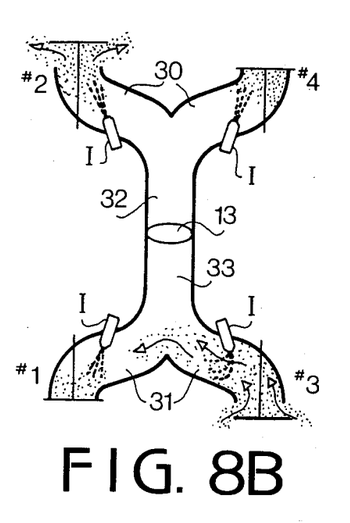
Figure 8C:
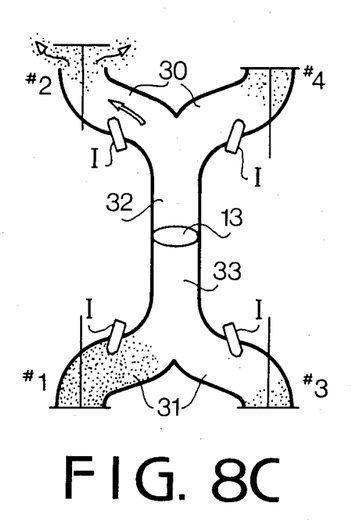

FIG. 8A shows the phenomenon occurring at the point P' in the left half of FIG. 6. When fuel is injected simultaneously by all of the injection valves I into the intake manifold sections 30, 31, at the time P' as shown in FIG. 6, the No. 2 cylinder begins to induce the mixture therein (see arrows at upper left side of FIG. 8B) because, as shown in FIG. 6, the intake valve for the No. 2 cylinder begins to open, the No. 3 cylinder induces more mixture (since its intake value is about fully open), and the Nos. 1 and 4 cylinders have their intake valves closed so that the injected fuel mixture there accummulates substantially in front of the intake valves for the Nos. 1 and 4 cylinders as indicated by the dotted representation of the fuel in FIG. 8A.

The fuel injection signal a continues for a while after P' and then ends at the trailing edge of the fuel injection signal a in FIG. 4. At the stage shown in FIG. 8B (corresponding to time 8B in FIG. 6) when the fuel is still being injected (i.e. prior to the end of the signal a of FIG. 4), the No. 2 cylinder induces more mixture than before since the injection valve of the No. 2 cylinder is wide open. But, since the intake valve of the No. 3 cylinder is closing, as shown by the dashed line 8B in FIG. 6 near the end of the opening time of the corresponding intake valve, a part of the air-fuel mixture previously induced into the No. 3 cylinder during its intake stroke flows back to the intake manifold section 31 at the end of the intake stroke of this cylinder as indicated by the arrows adjacent the No. 3 cylinder in FIG. 8B. Therefore, in this example, a part of the fuel injected by the signal a is carried back by the returning air-fuel mixture to a position adjacent the intake valve of the adjacent No. 1 cylinder through the common intake manifold section 31 and adds to the fuel injected from the injection valve for the No. 1 cylinder. Therefore, at the next stage FIG. 8C when the intake valve of the No. 3 cylinder has closed, and the fuel injection signal a has ended, a comparatively large unbalanced amount of extra fuel is stored in the space above the intake valve of the No. 1 cylinder. The dashed line 8C (also shown as P) in FIG. 6 indicates the exact time of the condition shown in FIG. 8C.

Figure 8D:
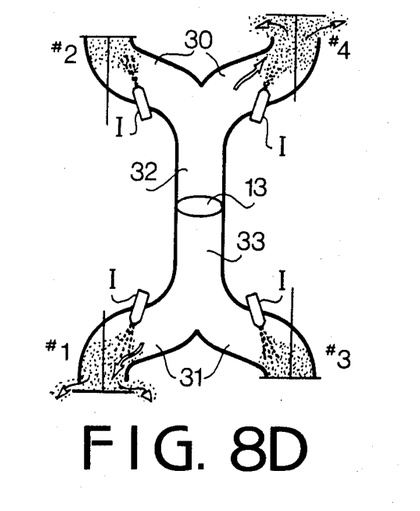
Figure 8E:
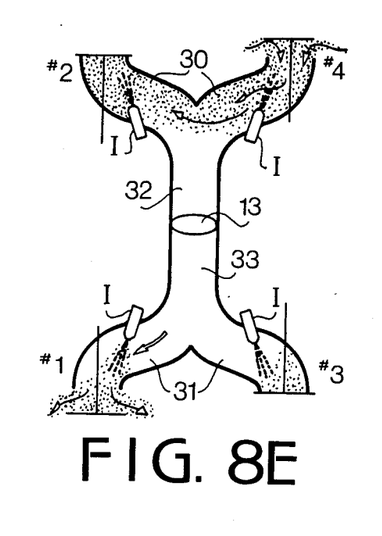
Figure 8F:
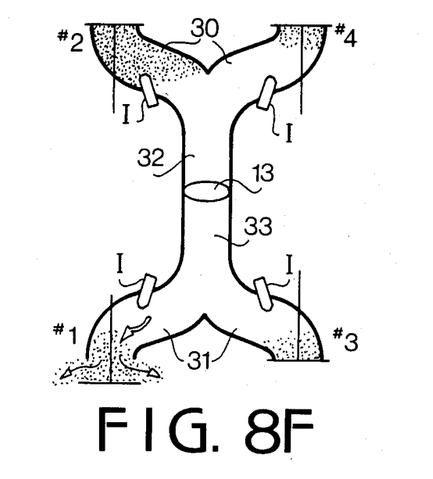

Subsequently the intake valve for the No. 1 cylinder begins to open as the next fuel injection signal b occurs, shown as the dashed line 8D in FIG. 6 at the leading edge of the fuel injection signal b of FIG. 4. As a result even more fuel from this new injection is added to the already rich excess unbalanced fuel mixture adjacent the No. 1 cylinder, and all of this fuel is subsequently induced into the No. 1 cylinder during the beginning and continuing intake stroke of the No. 1 cylinder as shown in FIGS. 8D-8F and further not shown stages while the intake valve for cylinder No. 1 is open at corresponding times 8D-8E (FIG. 6) unbalancing the action of this cylinder upon combustion. At the same time as the beginning of this second fuel injection time (FIG. 8D), the intake valve of the No. 4 cylinder is wide open, so that much fuel goes into the No. 4 cylinder. This is similar to the No. 3 cylinder during the first stage FIG. 8A and will cause fuel induced into the No. 4 cylinder to flow back (FIG. 8E) to adjacent the No. 2 cylinder for subsequent unbalancing of this cylinder.

In particular, at the stage, shown in FIG. 8E (time 8E in FIG. 6), as the intake valve of the No. 4 cylinder starts to close, fuel injected into the No. 4 cylinder flows back to the common intake manifold section 30 and stores at a position adjacent the intake valve of the No. 2 cylinder. The No. 1 cylinder is now inducing the excessively rich mixture mentioned above unbalancing the engine. Similarly, as fuel flowing back and provided by the injection valve I for the No. 4 cylinder is now added to the fuel provided by the injection valve I for the closed No. 2 cylinder, the density of fuel near the intake valve of the No. 2 cylinder becomes very high.

Figures 9, 10:
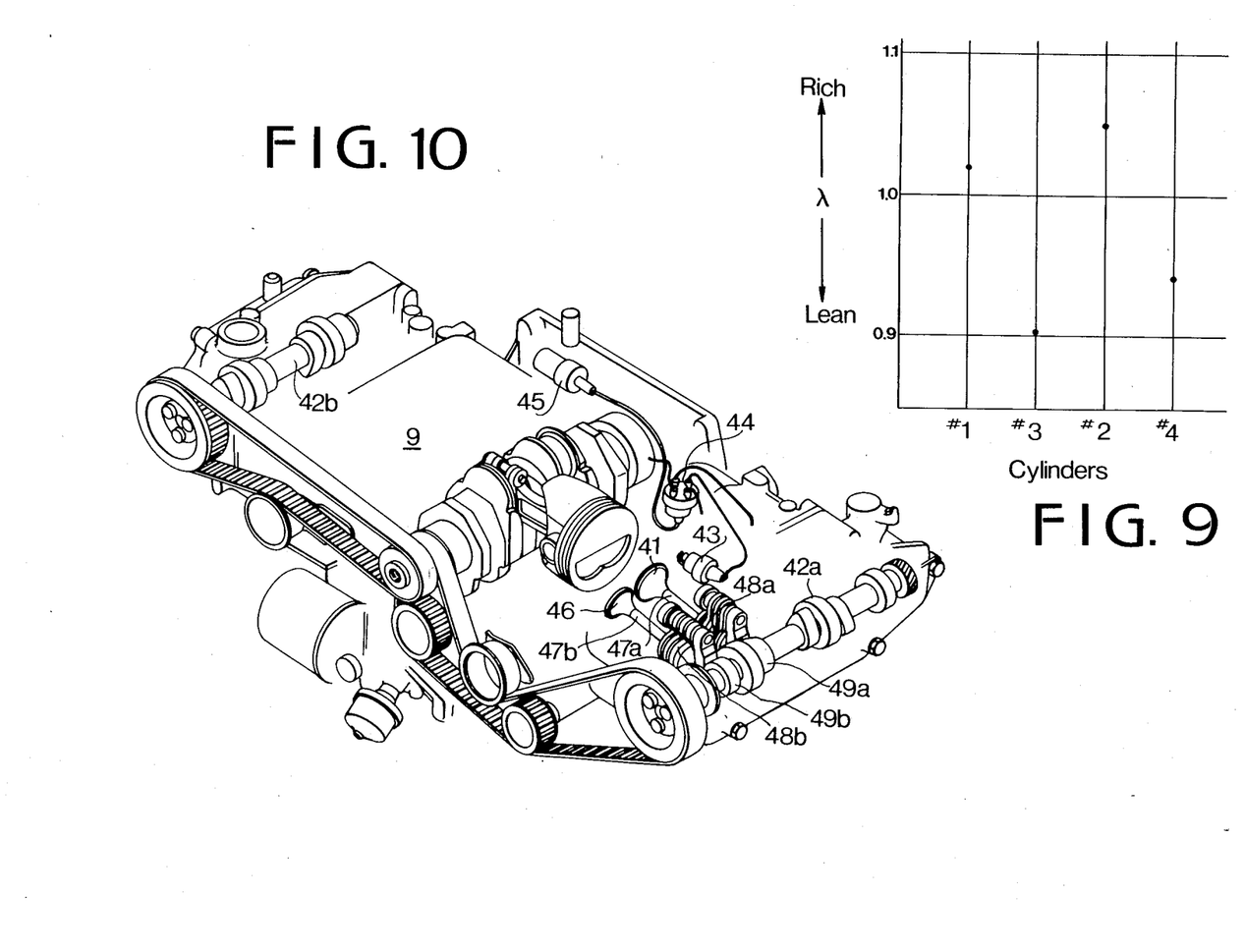
FIG. 9 is a graph showing fuel/air ratio provided to each cylinder of the prior art at 700 rpm.
FIG. 10 is a perspective view of a portion of the engine of FIG. 1 with several parts omitted for clarity of illustration.

Then next, as shown in FIG. 8F (time 8F of FIG. 6), the No. 1 cylinder is still inducing its rich mixture. Thus, the cycle shown in FIG. 8A to 8F repeats continuously. The Nos. 1 and 2 cylinders get more fuel than that of the Nos. 3 and 4 cylinders causing engine unbalancing. The fuel/air ratio of the Nos. 1 and 2 cylinders in this conventional system is higher than that of the other cylinders as shown in FIG. 9. Also the CO density in the cylinder Nos. 1 and 2 is higher than that of the cylinder Nos. 3 and 4 shown in FIG. 8 particularly at low engine r.p.m..

Accordingly fuel is unequally distributed into the cylinders. Such a defect is particularly noticeable in an engine having short branches of the common intake manifold sections 30, 31 from the junction to the intake valves and in a low engine speed range from about 700-750 (idling rpm) to 2000 rpm (normal driving). This flow back problem is a low speed phenomenon from between about idling 700-750 rpm to 2000 rpm (normal driving). At these speeds a lot of fuel flows back out of a cylinder near the end of the opening period of its intake valve as explained above.

According to the present invention there is provided a fuel injection system for an internal combustion engine having respective common intake manifold sections communicating adjacent cylinders with each other, wherein the fuel injection valves are opened by a fuel injection signal during periods when most of the intake valves of the cylinders is closed and before beginning of closing of all of the remaining intake valves of the remaining cylinders. Each fuel injection signal is produced simultaneously for all of the fuel injection valves during a time well before the end of the opening time of the remaining intake valves (not during the change from opening to closing thereof), that is not at the end nor immediately before the end of the intake stroke of any cylinder.

In accordance with another feature of the invention ignition signals of the engine are divided in order to produce trigger signals for the fuel injection signal in synchronism with ignition signals of, for example, cylinders Nos. 1 and 2. The fuel injection signal is provided in accordance with another feature of the invention by adding a period from the trigger signal from the ignition signal to the top dead center of a cylinder and a period from the top dead center to the intake valve closing time of the cylinder.

According to another feature of the invention, the fuel injection signal varies in crank angle duration depending on the engine rpm, but always ends at least at bottom dead center of a cylinder, the intake valve of which is open during the fuel injection signal.

With the above and other objects and advantages in view, the present invention will become more clearly understood in connection with the detailed description of preferred embodiments, when considered with the following accompanying drawings.

DETAILED DESCRIPTION OF THE PREFERRED EMBODIMENTS

Referring now to FIGS. 1, 1A, 1B and 1C, an engine 9 is an opposed four-cylinder horizontal type engine. Cylinders Nos. 1 and 3 of the engine and cylinders Nos. 2 and 4 on opposite sides of the engine communicate with each other by common intake manifold sections 31 and 30, respectively, of a common intake manifold (30-33), and each section 30, 31 is connected with each other by manifold branches 32 and 33 of the common intake manifold. An intake passage 13 feeds air into the manifold branches 32 and 33. Four fuel injection valves I are provided, namely one fuel injection valve I is provided adjacent each cylinder in each branch 30a, 30b and 31a, 31b of the intake manifold sections 30 and 31. Although not shown, a single injection valve can be provided for each adjacent group of cylinders (that is, a single injection valve for the Nos. 2 and 4 cylinders and a single injection valve for the Nos. 3 and 1 cylinders positioned at the junctions of the branches 30a, 30b, 31a, 31b of the common manifold sections 30 and 31 respectively).

Figure 1:
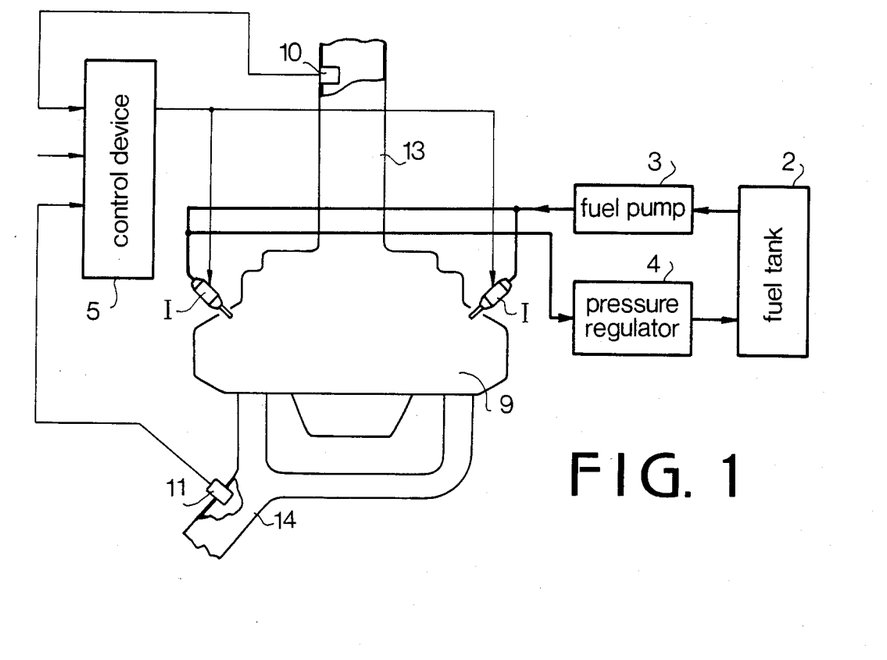
FIG. 1 is a schematic block diagram showing an embodiment of the present invention.
Figure 1A:
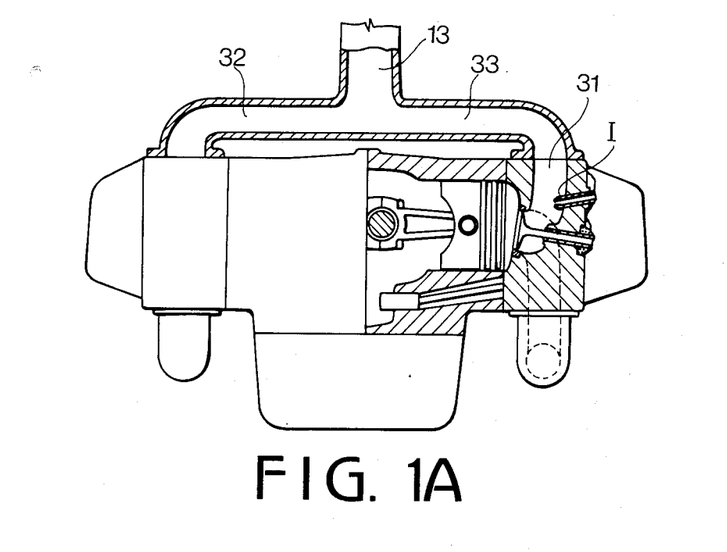
FIG. 1A is a plan view of the engine of FIG. 1 partly in section.
Figure 1B:
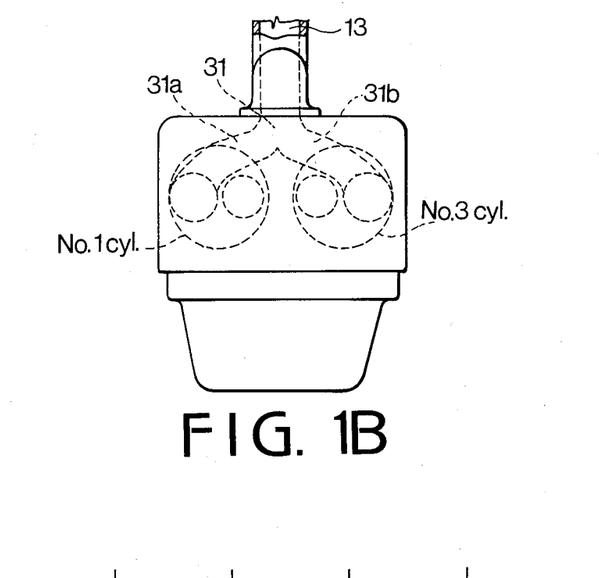
FIG. 1B is a right-side view of FIG. 1A.
Figure 1C:
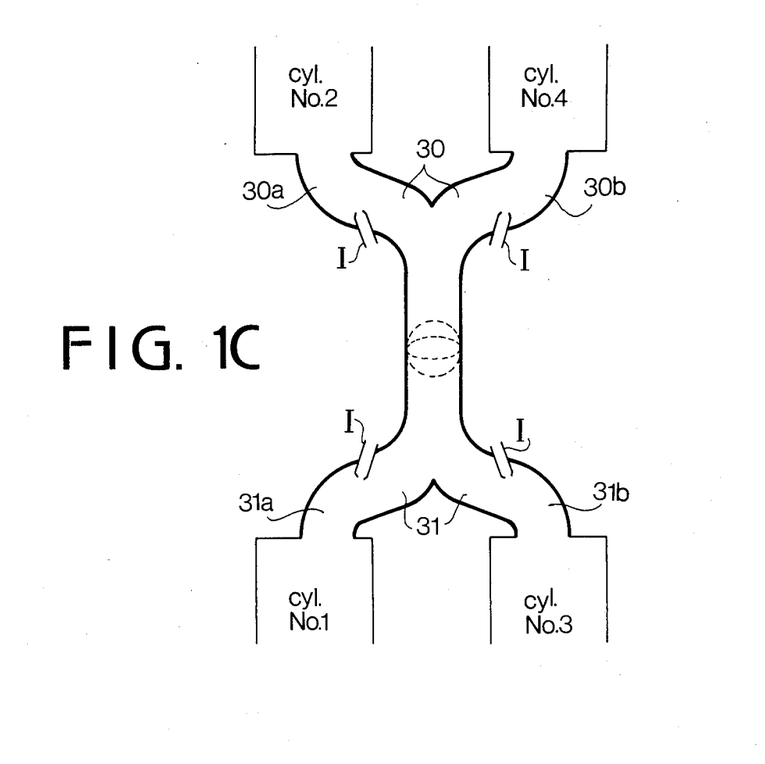
FIG. 1C is a top view showing the manifold leading to the cylinders.

Each fuel injection valve I supplies fuel to the corresponding adjacent cylinder from a fuel tank 2 by a fuel pump 3. Surplus fuel returns to the fuel tank 2 through a pressure regulator 4. All of the fuel injection valves I are simultaneously opened for injecting fuel and are simultaneously closed. The simultaneous opening and simultaneous closing of all of the fuel injection valves I are controlled by a control signal from a control device 5 for injecting the fuel at controlled times, so that the fuel is injected simultaneously from all four injection valves I.

Referring to FIG. 10 showing only the intake and exhaust valves for one cylinder (not shown), the intake valve 41 and exhaust valve 46 of the respective cylinders open and close in a predetermined sequence (FIG. 6) to admit the air-fuel mixture into the respective cylinder, and to exhaust the combustion gas from the cylinders, respectively, by cams 49a, 49b on camshafts 42a, 42b, stems 47a, 47b of the valves being pressed against the cams 49a and 49b by springs 48a, 48b respectively.

Spark plugs 43 (only one spark plug being shown in FIG. 10) are ignited at respective predetermined times by distributor 44 and ignition coil 45 when respective of the intake valves of the respective cylinders are closed or at least substantially closed, preferably at or slightly before TDC. The ignition time is P' shown in the left side of FIG. 6 for cylinder No. 1 and the ignition time P' (on the right side of FIG. 6) is for cylinder No. 2. The ignition times for the cylinders Nos. 3 and 4 are not shown in FIG. 6.

Figure 2:
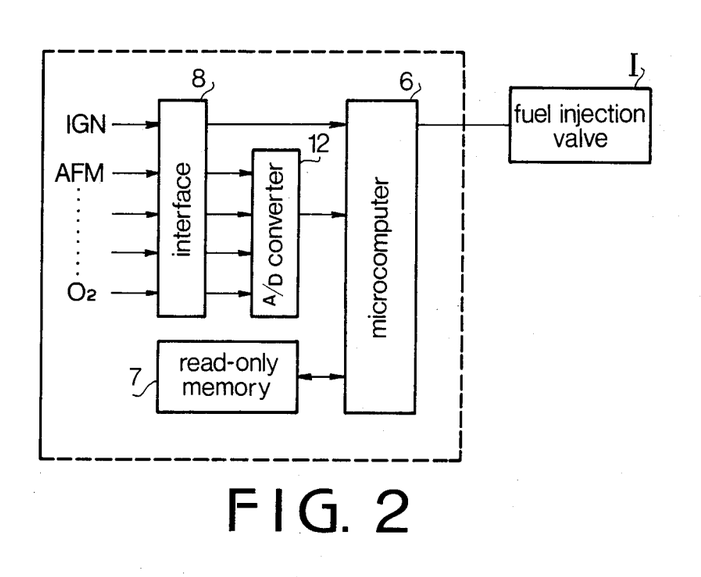
FIG. 2 is a block diagram of a control system.

As shown in FIG. 2, the control device 5 comprises a microcomputer 6, a read-only-memory 7 connected thereto, an interface 8 for receiving various data, and an A/D converter 12 connected between the interface 8 and the microcomputer 6. Data applied to the interface 8, for example, comprises an ignition signal IGN (or crank angle signal) as a standard signal which is picked up from the distributor 44 (FIG. 10) of the engine, an air-flow signal AFM from an air flow meter 10 provided in an inlet portion of the intake passage 13, an $O_2$ signal from an $O_2$ sensor 11 provided in an engine exhaust pipe 14 from the engine, a cooling water temperature signal from a thermo-sensor (not shown), a throttle valve opening degree signal for a throttle valve (not shown) disposed in the intake passage 13, as well as other data. Analog data is supplied to the microcomputer 6 through the A/D converter 12.

Figure 5:
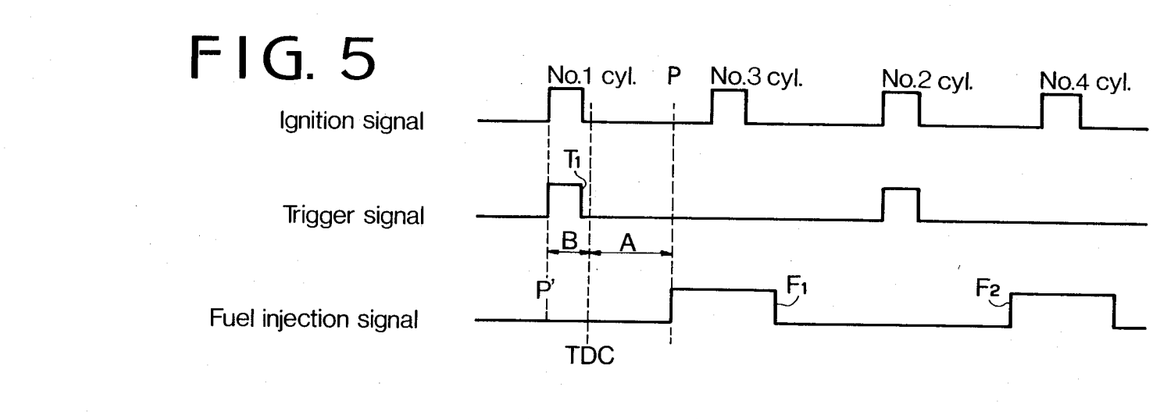
FIG. 5 is a time chart of various signals in a system of the present invention.

Referring to FIG. 5, ignition pulse signals (top of FIG. 5) are divided by a frequency divider (not shown) to produce trigger signals T1 at the ignition times of the cylinders Nos. 1 and 2 (or at the ignition times of the cylinders Nos. 3 and 4, not illustrated in the present example). The ignition pulse signals are shown starting at P' (left side) in FIGS. 6 and 6A-6C for cylinder No. 1, and at the right-hand side (at P' for cylinder No. 2) after the closing of the intake valves of the respective cylinder, although they may occur near the change from opening to closing of the corresponding intake valve. The ignition pulse signals of the cylinders Nos. 3 and 4 are not shown in FIGS. 6, 6A-6C but are shown in FIG. 5. The microcomputer 6 operates to add, from the beginning of the trigger signal T1, a period B to the top dead center (TDC) of the cylinder No. 1 and a period A from the top dead center of the cylinder No. 1 to early in the closed condition of the intake valve of the cylinder No. 3 to initiate a fuel injection signal $F_1$ at time P. Therefore, in the present example, fuel starts being injected at P (also see FIG. 6) by this fuel injection signal $F_1$ after the intake valve of the cylinder No. 3 has closed. This time is also before the intake valve of the cylinder No. 4 has opened. The signal $F_1$ starts early during the opening time of the intake valve of the cylinder No. 2, and finishes well before the bottom dead center (end of fuel intake stroke into this cylinder No. 2 when its piston reaches the bottom dead center) of the cylinder No. 2, that is sufficiently before the end of the opening period of its intake valve, particularly before the change from opening to closing of the intake valve of the cylinder No. 2.

Similarly, in this example a fuel injection signal $F_2$ is produced, from the trigger signal derived from the ignition of the No. 2 cylinder, after the intake valve of the cylinder No. 4 has closed. This is also before the intake valve of the cylinder No. 3 has opened. The signal $F_2$ starts at time P (right-hand side P in FIG. 6) early during the opening time of the intake valve of the cylinder No. 1, and finishes well before the bottom dead center (end of fuel intake stroke into this cylinder No. 1 when its piston reaches the bottom dead center) of the cylinder No. 1, that is sufficiently before the end of the opening period of its intake valve, particularly before the change from opening to closing of the intake valve of the cylinder No. 1. As a result no flow back occurs and equal fuel distribution to each cylinder occurs.

Figure 3:
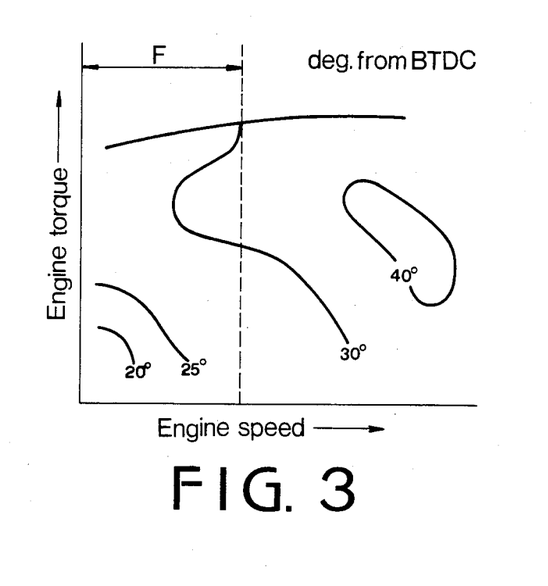
FIG. 3 is an ignition timing map.

FIG. 3 shows a zone F in which a large amount of air flows back into the intake manifold sections 30, 31 at the end of the opening periods of the intake valves. In FIG. 3, the ignition timings are designated by degrees before the top dead center (BTDC). In a low engine speed range 750-2500 rpm, maximum ignition timing in the zone F is 30 degrees (BTDC). The intake valve closing time of the cylinder No. 3 shown in FIG. 6 is approximately 60 degrees after the top dead center of cylinder No. 1. Therefore, preferably the beginning of fuel injection timing at this low engine speed range zone F is at most about 90 degrees after the beginning of the ignition signal of the cylinder No. 1 in the embodiment described above.

In FIG. 6, point P' also represents beginning of the fuel injection timing in the conventional fuel injection system, whereas points P show the beginning of the fuel injection times in the system of the present invention.

In accordance with the present invention, for all cylinders fuel is injected simultaneously by all the fuel injection valves I while the intake valves of most of the cylinders are closed, i.e. before the opening of, or after the closing of these intake valves (in the example, at the left side of FIGS. 6, and 6A-C these cylinders with the closed intake valves are the Nos. 1, 3 and 4 cylinders), and for the remaining cylinder No. 2 early during the opening time and not during or near the end of the opening, nor while changing from opening to closing of the intake valve of the cylinder No. 2. That is not at the times applied in the conventional engine at the end of the opening of the intake valve. Even at 2000 rpm at wide open throttle—(w.o.t.) FIG. 6C, the left-most injection period ends sufficiently before and not near the end of the opening period nor while changing from opening to closing of the intake valve of the No. 2 cylinder, but substantially before the end of the opening period for the intake valve of the No. 2 cylinder so that no substantial flow-back of fuel occurs as in the prior art. As a result of this, any flow-back out of a cylinder when its intake valve is closing does not affect the amount of fuel induced in the other cylinders, and therefore fuel is uniformly distributed to all cylinders of the engine. There is no problem caused by fuel flow-back caused by closing of the intake valves when no fuel injection occurs during this time of closing of the intake valves.

Figure 6A:
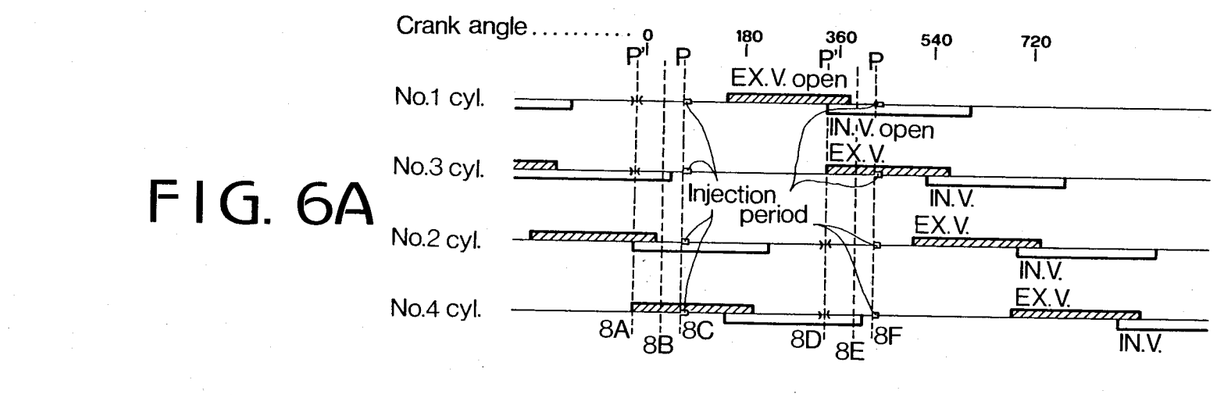
Figure 6B:
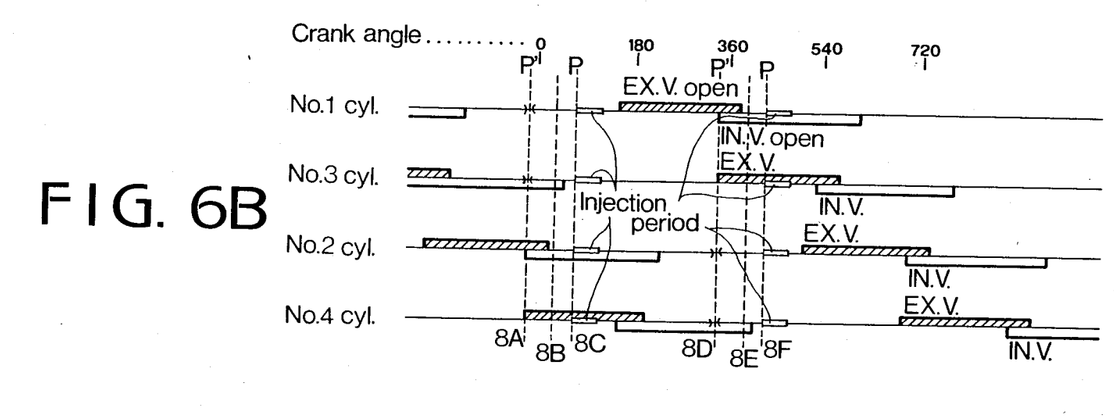
Figure 6C:
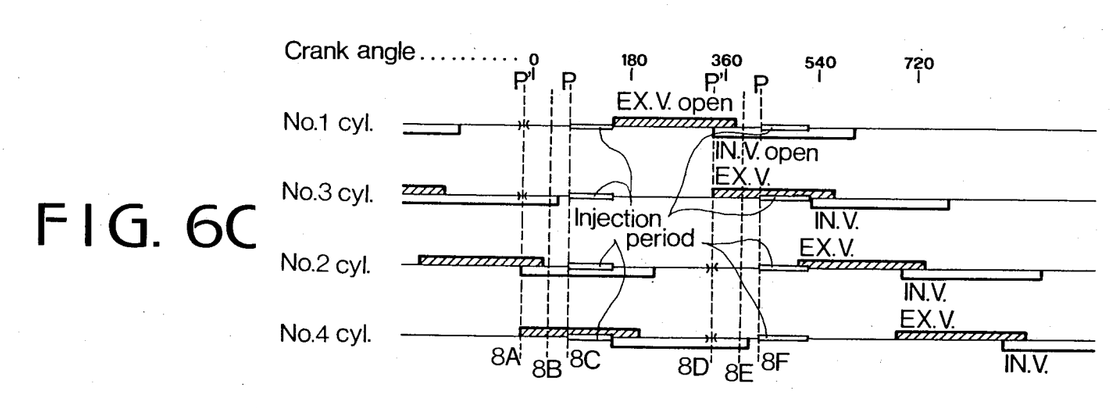
Figure 7:
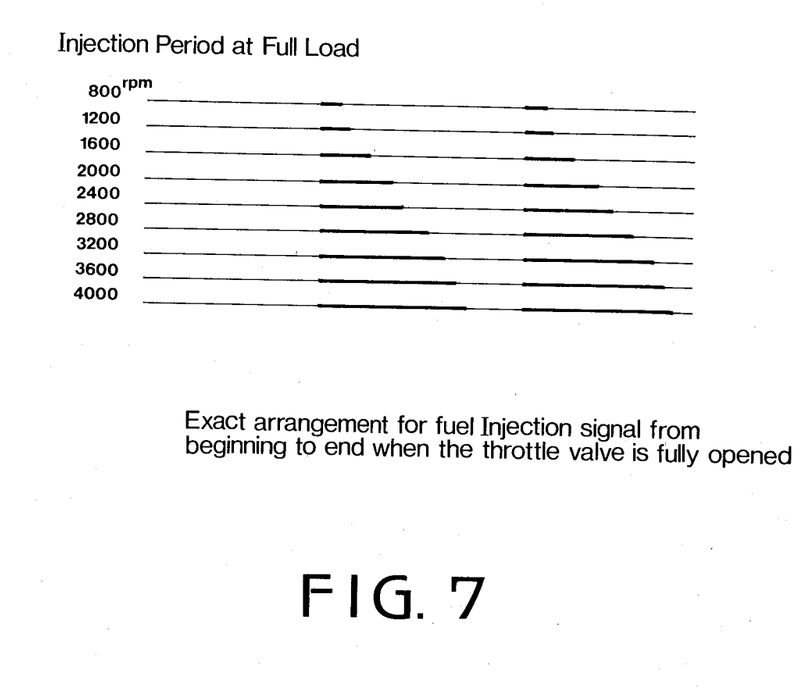
FIG. 7 is a bar graph of the time duration of the fuel injection at various engine rpm at wide open throttle.

FIGS. 6A, 6B and 6C show the timing and duration of the fuel injection periods in accordance with the present invention during idling at 800 rpm, 2000 rpm at partial load and 2000 rpm at full load (wide open throttle—w.o.t.) respectively and FIG. 7 shows the extent of fuel injection periods at w.o.t. for different rpm at full load. The fuel injection period increases with an increase in rpm and an increase in load, respectively.

In the claims "opening" or "open" refers to the open condition of a valve and "closing" or "closed" refers to the closed condition of a valve. The "beginning of closing" refers to the transition from the open condition to the closed condition.

While the presently preferred embodiments of the present invention has been shown and described, it is to be understood that this disclosure is for the purpose of illustration only and not in a limiting sense and that various changes and modifications may be made and equivalents used without departing from the spirit and scope of the invention as set forth in the claims.

I claim:

1. In a fuel injection system for four-cylinder internal combustion engine having a common intake manifold connected to the cylinders of the engine on both sides of the engine with respective branches of respective common intake manifold sections of the common intake manifold being connected with adjacent cylinders on both sides of the engine respectively via fuel-air intake valves of the cylinders, respectively, the fuel-air intake valves of the respective cylinders opening and closing in predetermined sequential order defining a cycle, and ignition in the respective cylinders occurring at respective predetermined timings, the improvement comprising at least one fuel injector being disposed in each of said common intake manifold sections, said fuel injectors being operable by a fuel injection signal so as to permit injection of fuel into the manifold sections, and means for generating the fuel injection signal for opening said fuel injectors when three of said intake valves of said cylinders are closed and before beginning of closing of the remaining intake valve of the remaining cylinder.

2. The system according to claim 1, wherein said means further comprises:

means for producing a trigger signal dependent on the ignition timing of at least one of said cylinders; and computing means for producing said fuel injection signal from said trigger signal.

3. The fuel injection system for an internal combustion engine according to claim 2, wherein said producing means is for producing said trigger signal by dividing the ignition timings of said cylinders by the number of said cylinders which are respectively intercommunicated with each other by each of said common intake manifold sections, and for producing said trigger signal at the time of the ignition timing for one of said cylinders which is ignited first on each side of the engine, respectively.

4. The fuel injection system for an internal combustion engine according to claim 3, wherein said computing means is for producing a beginning of the fuel injection signal by adding a time to the beginning of said trigger signal constituting a first period extending from the beginning of said trigger signal to top dead center of said one cylinder on each side of the engine, respectively, and a second period extending from said top dead center to a time when respective three intake valves of said cylinders are closed and early during the opening of the remaining intake valve of the remaining cylinder respectively.

5. The system as set forth in claim 4, wherein said computing means terminates said fuel injection signal when said respective three intake valves of said cylinders are still closed and before beginning of closing of the remaining intake valve of the remaining cylinder respectively.

6. The fuel injection system for an internal combustion engine according to claim 1, wherein said fuel injectors open and respectively close simultaneously by said fuel injection signal.

7. A method for injecting fuel in a fuel injection system for a four-cylinder internal combustion engine having at least one fuel injector in a common intake manifold section connected to the cylinders of the engine with respective branches of each common intake manifold section of the common intake manifold being connected wtih adjacent cylinders on both sides of the engine via fuel-air intake valves of the cylinders, respectively, comprising the steps of opening and closing the fuel-air intake valves of the respective cylinders in predetermined sequential order defining a cycle, igniting fuel-air mixture in the respective cylinders beginning at respective predetermined timings, and opening said fuel injectors by a fuel injection signal to inject fuel into the manifold sections during any period in the cycle other than during changing from opening to closing of every intake valve.

8. The method according to claim 7, wherein said opening step for fuel injection occurs when three of said intake valves are closed and during opening but prior to changing from opening to closing of the remaining intake valve.

9. The method according to claim 8, wherein said injectors comprise at least one separate injector in each of said common intake manifold sections, respectively, said opening step for fuel injection comprises simultaneously opening all of said separate injectors so as to simultaneously inject fuel therefrom by said fuel injection signal.

10. The method according to claim 8, further comprising said injectors comprise a separate injector in each branch of each of said common intake manifold sections adjacent a respective intake valve of the respective cylinder, said opening step for fuel injection comprises simultaneously opening all of said separate injectors so as to simultaneously inject fuel therefrom by said fuel injection signal.

11. The method according to claim 8, further comprising the step of
running said engine at rpm between 700–2500 rpm.

12. The method according to claim 8, wherein
the duration of said opening of said fuel injection valve relative to the duration of said cycle increases with increasing engine rpm and increasing opening of a throttle valve of the engine.

13. The method according to claim 9, wherein
said opening of said fuel injectors begins at fixed timings in said cycle.

14. The method according to claim 9, wherein
the opening periods of said intake valves of said cylinders in said predetermined sequential order overlap, the overlap substantially starting slightly before the beginning of the closing of respective of the intake valves.

15. The method according to claim 9, wherein
said predetermined sequential order of opening of said intake valves is sequentially opening of all said intake valves of the respective cylinders on one side of the engine communicating via one of said common intake manifold sections prior to sequentially opening of all said intake valves of the respective cylinders on the other side of the engine communicating via another of said common intake manifold sections.

16. The method according to claim 9, wherein
each side of said cylinder has two of said cylinders.

17. In a fuel injection system for a four-cylinder internal combustion engine having common intake manifold sections connected to the cylinders of the engine via fuel-air intake valves of the cylinders, respectively, the fuel-air intake valves of the respective cylinders opening and closing in predetermined sequential order defining a cycle, and ignition in the respective cylinders occurring at respective predetermined timings, the improvement comprising
at least one fuel injector being disposed in each of said common intake manifold sections, said fuel injectors being operable by a fuel injection signal so as to permit injection of fuel into the manifold sections, and
means for producing the fuel injection signal for opening said fuel injectors when three of said intake valves of said cylinders are closed and before beginning of closing of the remaining intake valve of the remaining cylinder.

* * * * *